Feb. 8, 1949.  R. S. DE MARTINI  2,460,812
SEMIAUTOMATIC JIG
Filed March 12, 1946
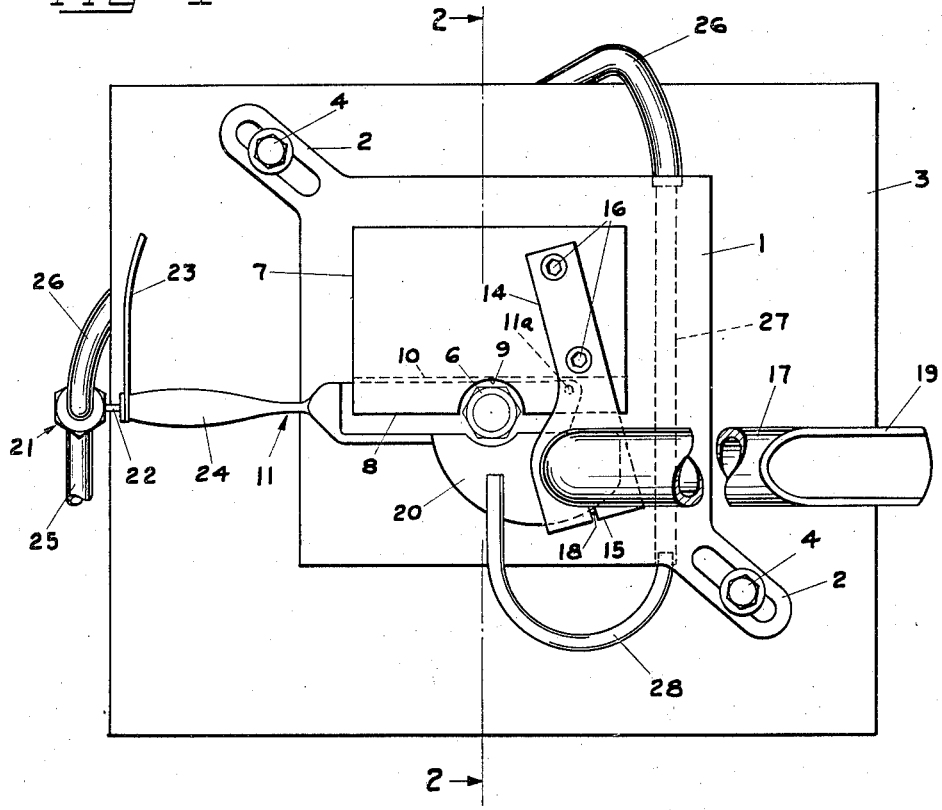
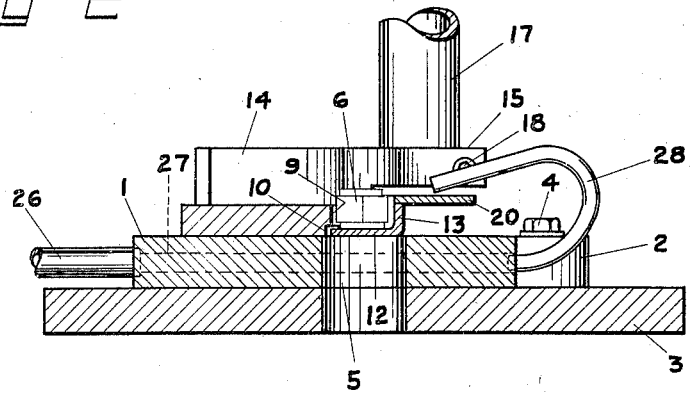
INVENTOR.
RALPH S. DE MARTINI
BY
*M. C. Hayes*
ATTORNEY Patented Feb. 8, 1949

2,460,812

UNITED STATES PATENT OFFICE 2,460,812

SEMIAUTOMATIC JIG

Ralph S. De Martini, San Leandro, Calif.

Application March 12, 1946, Serial No. 653,919

5 Claims. (Cl. 77—62)

(Granted under the act of March 3, 1883, as amended April 30, 1928; 370 O. G. 757)

The present invention relates to machine tool fixtures.

Objects of the present invention are to provide an improved machine tool fixture greatly facilitating the feeding of workpieces, the positioning of them for work thereon, and the expelling of the workpieces when the work thereon is completed; to provide a semi-automatic fixture for accomplishing the above with a minimum of manual operation; to provide an improved construction and arrangement of elements in a device of the character described and for the purposes set forth; and to accomplish the above objects in a facile, efficient, and economical manner.

In accomplishing these and other objects of the present invention, I have provided improved details of structure, the preferred form of which is illustrated in the accompanying drawings, wherein:

Fig. 1 is a plan view showing a fixture embodying the features of the present invention mounted on the work table of a drill press; and, Fig. 2 is a transverse section through the fixture of Fig. 1 and taken along the line 2—2 of Fig. 1.

Referring more in detail to the drawing:

A base 1, is provided with slotted outwardly extending elements 2 for securing the fixture to the work table 3, of a drill press or other machine tool (not shown) by the bolts 4. The base 1, has an opening 5, substantially centrally disposed, through which workpieces such as the nut 6, are expelled upon completion of the work thereon. A positioning plate 7, is secured to the base 1, and has a lateral surface 8, which extends across the opening 5. Said lateral surface 8, is provided with a substantially semi-circular recess 9, generally aligned with the opening 5, in the base 1. Adjacent the base 1, and along the lower edge of said lateral surface 8, the plate 7, is longitudinally recessed as indicated at 10, to receive one leg of an L-shaped arm 11. The arm 11 may be formed of angle iron and is pivotally mounted by means of a pivot pin 11a on the base 1 on one side thereof so as to permit said arm 11 to be pivoted about an axis parallel to that of the opening 5 to a position in which the leg 12, of said arm 11, is received in said longitudinal recess 10, and the other leg 13 of said arm 11, parallels the lateral surface 8, of the plate 7. The workpiece, such as the nut 6, is supported on the leg 12, of the arm 11, and is held in the semicircular recess 9, by its engagement with the leg 13, of the arm 11.

A feed tube holder 14, is mounted on the positioning plate 7, by the screws 16, and has a bifurcated end 15, adapted to hold in a vertical position, the end of a feed tube 17, which is clamped in said bifurcated end 15, by the action of screw 18. The feed tube 17 may be bent to extend away from said tube holder 14, at any desired angle which will afford the desired feed of the workpieces through the tube 17, by the force of gravity. Adjacent the upper and outer end of the tube 17, the upper wall of the tube is cut away as at 19, to facilitate the insertion of workpieces into the tube 17.

A second plate 20, substantially semi-circular in shape, is mounted on the upper edge of the leg 13, of the arm 11, and extends parallel to the base 1, and in a direction away from the plate 7. The plate 20, is adapted to cover the lower end of the feed tube 17, at all times except when the arm 11, is pivoted away from the plate 7, to a position in which the leg 12 of the arm 11, is disposed below the lower end of the tube 17, at which time a workpiece drops onto said leg 12 of the arm 11.

An air valve 21 having a horizontally extending control plunger 22 and means (not shown) urging said plunger 22 to its extended or closed position, is mounted on the work table 3 for actuation to its closed position by a cam plate 23, secured to the free end of the arm 11. Adjacent said free end the arm 11 is formed to provide a handle 24, for manually pivoting said arm 11, and actuating said valve 21. Air pressure is supplied to the valve 21 through a hose 25 from a source (not shown), and from valve 21, the air pressure is supplied through a hose 26, to a bore 27, in the base 1. A metal tube 28 has one end connected to the other end of the bore 27 and the other end of the tube 28 is directed at the position in which the workpiece is held while work is being done upon it. By this construction the air pressure causes a stream of air to be directed against the workpiece as the arm 11 is pivoted away from the plate 7, and the workpiece is blown off the leg 12 of the arm 11, upon which it is supported, and falls through the opening 5 in the base 1, which may be aligned with an opening in the work table 3. Regarded from another viewpoint, perhaps more logically, the air pressure holds the workpiece fixed in position relative to the base by urging it against the recess 9 in the plate 7 while the arm 11 is retracted from the plate 7 and hence from the workpiece. Thereafter, being no longer supported by the leg 12 of the arm 11, the workpiece is free to fall through the opening 5 in the base 1.

Operation

The operation of a machine tool fixture constructed as shown and described is as follows:

Workpieces such as the nut 6, are inserted in the feed tube 17 through the cutaway portion at 19 in the upper end of the feed tube 17, and are moved toward the base 1 by the force of gravity, and are restrained within said tube by the plate 20, mounted on the arm 11, when said arm 11, is in the position shown in the drawing. The arm 11 is then manually pivoted away from the plate 7, by means of the handle 24, to a position in which a workpiece drops from the feed tube 17, onto the leg 12, of the arm 11, as described above. The arm 11 is then pivoted to a position in which it parallels the lateral surface 8, of the positioning plate 7, and holds the workpiece in the semi-circular recess 9, until the work thereon is completed. As the arm 11, is pivoted toward the feed tube 17, again, the cam plate 23 depresses the plunger 22, causing the valve 21, to open and the workpiece is blown against the plate 7, while the arm 11 is retracted from the plate 7, and thereafter drops from the fixture under the action of gravity as described above. As the cam plate 23, is drawn clear of the plunger 22, the plunger is permitted to return to its extended closed position and the air is shut off.

While I have shown but one embodiment of my invention, it is apparent that the device is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In a machine tool fixture of the class described, the combination of a base, a gravity operated feed tube adapted to support a plurality of workpieces and feed said workpieces to said base, a plate secured to said base, an arm pivoted to said base and adapted to individually receive said workpieces from said tube and position them against said plate for work thereon, a second plate mounted on said arm and disposed in offset relation to said tube when said arm is in the position in which it receives a workpiece from said tube and said second plate being adapted to close the lower end of said tube when said arm is moved from said position and toward said first mentioned plate, and pneumatic means cooperable with said aforementioned elements for expelling said workpieces from said fixture when the work thereon is completed, said pneumatic means including a valve adapted for operation by said arm, said valve being closed when said arm is against said first mentioned plate and said valve being open during the first part of the motion of said arm away from said plate.

2. In a machine tool fixture of the class described, the combination of a base, a feed tube adapted to support a plurality of workpieces and feed said workpieces to said base, a plate secured to said base, an arm pivotally mounted on said base and adapted to receive a workpiece from said tube and position said workpiece against said plate for work on said workpiece, and pneumatic means cooperable with said aforementioned elements for expelling said workpiece from said fixture when the work on said workpiece is completed, said pneumatic means including a valve adapted for operation by said arm.

3. In a machine tool fixture of the class described, the combination of a base having a discharge opening, a feed tube adapted to support a plurality of workpieces and feed said workpieces to said base, means for receiving a workpiece from said tube and positioning said workpiece for work thereon at a work station above said discharge opening, and pneumatic means cooperable with said first mentioned means for expelling said workpiece from said fixture when the work thereon is completed by retaining said workpiece at said work station while said first mentioned means is retracted from said workpiece, whereby said workpiece may drop through said discharge opening.

4. In a machine tool fixture of the class described, the combination of a base having a discharge opening therein for workpieces, a feed tube adapted to support a plurality of workpieces and feed said workpieces to said base, a plate secured to said base, an arm pivotally mounted on said base and adapted to receive a workpiece from said tube and position said workpiece against said plate in a position vertically above said discharge opening for work on said workpiece, and pneumatic means cooperable with said aforementioned elements to assist in expelling said workpiece from said fixture when the work is completed thereon by urging said workpiece against said plate while said arm is retracted from said plate, whereby said workpiece may drop under the action of gravity through said discharge opening after retraction of said arm.

5. In a machine tool fixture of the class described, the combination of a base having a discharge opening therein, feed means for supporting a plurality of workpieces and feeding said workpieces to said base, means movable toward said feed means for receiving a workpiece from said feed means and movable away from said feed means for positioning said workpiece for work thereon at a work station above said discharge opening, pneumatic means cooperable with said aforementioned means for expelling said workpieces from said fixture when the work thereon is completed by retaining said workpiece at said work station while said receiving means is withdrawn therefrom, whereby said workpiece is free to drop through said discharge opening, and means actuated by said receiving means upon the initial movement thereof toward said feed means for controlling the energization of said pneumatic means.

RALPH S. DE MARTINI.

REFERENCES CITED

The following references are of record in the file of this patent:

UNITED STATES PATENTS

| Number | Name | Date |
| --- | --- | --- |
| 378,747 | Wattie | Feb. 28, 1888 |
| 1,701,644 | Stull | Feb. 12, 1929 |
| 1,994,178 | Raiche | Mar. 12, 1935 |
| 2,117,376 | Strayer | May 17, 1938 |
| 2,353,757 | Priest, Jr. | July 18, 1944 |
| 2,356,087 | Prokul | Aug. 15, 1944 |